United States Patent [19]

McFarlane et al.

[11] Patent Number: 5,252,215

[45] Date of Patent: Oct. 12, 1993

[54] ADSORBENT MATERIALS AND USE THEREOF

[75] Inventors: Ian D. McFarlane, Christchurch; Maree A. Hamilton; Garth A. Carnaby, both of Lincoln, all of New Zealand

[73] Assignee: Wool Research Organisation of New Zeland, Inc., Canterbury, New Zealand

[21] Appl. No.: 835,465

[22] PCT Filed: Sep. 3, 1990

[86] PCT No.: PCT/GB90/01358

§ 371 Date: Apr. 21, 1992

§ 102(e) Date: Apr. 21, 1992

[87] PCT Pub. No.: WO91/03428

PCT Pub. Date: Mar. 21, 1991

[30] Foreign Application Priority Data

Sep. 1, 1989 [NZ] New Zealand .................. 230541

[51] Int. Cl.$^5$ ............................................. E02B 15/04
[52] U.S. Cl. ................................ 210/69.1; 210/502.1; 210/924
[58] Field of Search .............. 210/242.4, 922, 923, 210/924, 691, 502.1, 799

[56] References Cited

U.S. PATENT DOCUMENTS

| Re. 31,087 | 11/1982 | Sohl ........................... 210/924 |
| 3,739,913 | 6/1973 | Bogosian .................... 210/924 |
| 3,959,127 | 5/1976 | Bartha et al. ................ 210/27 |
| 4,061,567 | 12/1977 | Kobayashi et al. .......... 210/40 |
| 4,087,356 | 5/1978 | Marconi et al. ............. 210/922 |
| 4,102,783 | 7/1978 | Zenno ......................... 210/691 |
| 4,316,804 | 2/1982 | Bocard et al. ............... 210/924 |
| 4,332,854 | 6/1982 | Parker ......................... 210/924 |
| 4,414,333 | 11/1983 | Olivieri et al. .............. 210/922 |
| 4,761,857 | 8/1988 | McFarlane et al. .......... 19/106 R |
| 4,822,490 | 4/1989 | Dyadechko et al. ......... 210/922 |
| 4,925,343 | 5/1990 | Raible et al. ................ 210/924 |

FOREIGN PATENT DOCUMENTS

| 2146739 | 3/1972 | Fed. Rep. of Germany . |
| 2138037 | 2/1973 | Fed. Rep. of Germany . |
| 2714744 | 10/1978 | Fed. Rep. of Germany . |
| 1266366 | 3/1972 | United Kingdom . |

OTHER PUBLICATIONS

Patent Abstracts of Japan, vol. 10, No. 377 (C-392) (2434), Dec. 16, 1986 of JP Appln. 60-10357.

*Primary Examiner*—Stanley S. Silverman
*Assistant Examiner*—Cynthia L. Nessler
*Attorney, Agent, or Firm*—Watson, Cole, Grindle & Watson

[57] ABSTRACT

A method for absorbing hydrophobic substances in liquid form, by subjecting the liquid to contact with an adsorbent material comprising fibers in knop form, which has a spherical fiber orientation gained in the knopping process. The knopping process parameters form the fibers into knops of a wide range of densities in order to allow optimized oil adsorbency for a range of oil viscosities. The fibrous material can be modified by including the use of chemicals, such as water repellants, to modify the surface characteristics of the fibers to enhance oil pick-up or flotation. The fibrous material can be used in conjunction with a containment device made of netting or porous material shaped into an elongated system or pad to allow oil and oil water mixtures to penetrate the netting.

14 Claims, No Drawings

ADSORBENT MATERIALS AND USE THEREOF

BACKGROUND OF THE INVENTION

1. Field of the Invention

This invention relates to material for use in adsorbing spillages of liquid organic substances.

2. The Prior Art

A major pollution problem is the spillage of large amounts of oil such as when being transported in bulk on the sea or on land, The damage caused by such spillages is well documented. There have been numerous attempts at providing methods and materials to overcome this problem. Suggestions have been materials to adsorb the spilled oil, substances designed to enable the oil to mix with water and physical barriers designed to inhibit the spread of oil for example when a spillage occurs at sea. One material that is available commercially is that marketed by the 3M Company of the USA under the trade mark "POWERSORB" or "OIL-SORB". This may consist of layers of fibrous polypropylene encased in suitable netting and shaped as long elongate systems designed to float on the surface of water and act as a physical barrier to the spread of the oil as well as being designed to adsorb the oil. The adsorbency characteristics of the polypropylene has been on of the attributes to their successful use. While oil spillages are the most well recognised problem, spillages of other large quantities, of generally liquid organic materials can also be environmentally serious. The materials include large amounts of vegetable oils, refined oils and such like.

SUMMARY OF THE INVENTION

It is an object of this invention to provide a material having good adsorbency for oil and other organic materials.

In accordance with this invention there is provided a method for adsorbing hydrophobic substances in liquid form, comprising subjecting the liquid to contact with an adsorbent material comprising fibres formed into entangled bodies call knops.

"Knops" are small balls of entangled fibres, i.e., fibres which are wrapped and/or felted on themselves, and are essentially spherical in shape.

Knops can be manufactured by machinery of the general type described in U.S. Pat. No. 4,761,857 for the manufacture of longtailed neps, and it is possible to increase the versatility of application of the fibers to adsorb organic or synthetic oils by this means. The material can be used in any loose, uncontained form.

The loose fibrous material in knop form has its additional containment attributes gained by having a spherical fibre orientation.

The fibrous material in knop form has increased buoyancy attributes in a water medium compared to that of fibrous material not in knopped form.

Variations in the process for making knops can cause the knops to have a wide range of densities in order to allow optimised oil adsorbency for a range of oil viscosities.

The fibrous material can be modified by including the use of chemicals, such as water repellents, to modify the surface characteristics of the fibres and enhance the oil pick-up or bouyancy of the material in water.

The fibrous material can be used in conjunction with a containment device made of netting or porous material shaped into an elongated system or pad to allow oil and oil water mixes to penetrate the netting.

The fibrous material can be used in conjunction with other fibres or buoyancy aids to increase the oil adsorbancy or knop buoyancy in water.

The fibrous material can be used in conjunction with bacterial nutrients such as Inipol 22 to allow bacteria to break down the oil.

The fibrous material can be used as a filter to filter oil from and oil and water mixture.

The fibrous material can be used in with reused, dyed or undyed fibrous materials in knop form.

The fibrous material is preferably knops of wool. Knops have a number of uses primarily as a fill such as in upholstery, pillows and other household articles, but their very high adsorbancy character for organic liquids, particularly oil, more particularly crude oil, has never been suggested before.

It has been known that wool has an affinity for oil, particularly if some of the natural wool grease remains on the fibre. After forming to knops this affinity increases greatly. It is thought this increase in affinity is created by the spherical shape of the fibres comprising the knop. The oil tends to break up into droplets and then migrate into the centre of each knop. It is this ability which can be exploited by using the knops as a means of adsorbing oil spills. A few simple laboratory test revealed that untreated knops could adsorb up to thirty times their own weight of viscous oils.

Laboratory tests in a water bath indicate that wool knops will adsorb oil more readily if allowed to float unconstrained on the surface of the oil-water interface. If contained in a netting their adsorbtion rate is slower, but they should maintain their original adsorbency rate provided they are not packed or loaded too tightly.

The invention envisages using other fibers of natural or synthetic polymers which can be formed into entangled bodies of fibre of the type envisaged by the invention.

The invention also envisages using mixtures of various types of synthetic or naturally occurring fibres in the form of discrete entangled bodies.

Woollen knops have demonstrated in trials to be of particular value as an adsorbent material and have the further advantage in that virtually any type and grade of wool can be used to make the knops. Thus, even short staple fibres can be used together with either scoured or semi-scoured wool, crutchings and other waste remnants or other fibrous by-products.

The size of the entangled bodies of fibre is not currently envisaged as being critical. It is also envisaged that the size of the individual entangled bodies in an adsorbent pad formed from the entangled bodies need not be uniform and can vary considerably. Generally if knops are produced by knop producing machines such as that described in U.S. Pat. No. 4,761,857, they will tend to be of a substantially uniform size. Uniformity of size may be of value to yield a predetermined adsorbency characteristic to a particular pad consisting of a large number of knops packaged together.

The major use for an adsorbent material will be where crude oil or other oil spillages occur on water. The oil tends to float on the surface of the water and hence the adsorbent material needs to operate in this environment. The invention envisages shaping a mass of the small bodies of fibres into a form suitable to adsorb oil masses floating on the surface of water. The conglomerate of bodies of fibres can thus be shaped into any suitable elongate structure or containment device such as that described in UK patent specification no. 1266366 which is of a length required to surround the oil spillage and enable the adsorbent material to contact the oil. Thus the mass or conglomerate of bodies of the fibres will be contained in a suitable porous enclosure designed to retain the bodies of material in place but permit the liquid such as the oil spillage to contact the adsorbent bodies and to be adsorbed thereby. The outside material can be suitable netting fabric or other porous material.

The whole elongate structure or device must float on the surface of the water. Wool as well as some synthetic polymers and natural polymers, tend to be more dense than water and hence will not inherently float. Thus the structure may incorporate flotation aids or alternatively the bodies of fibres can be treated or else be processed in such a way that they are inherently buoyant on water.

Thus the invention may envisage incorporating substances which are lighter than water into the bodies of fibres to a sufficient degree that the bodies are buoyant. Other methods of decreasing the wettability of the fibres have been used to increase buoyancy. By doing this the bodies of fibres are supported by the surface tension of the water and float rather than being wet out and sinking. For example, small quantities of oil or similar compounds can be added to increase the floating ability of the sorbent. It has been found however by adding oil in this way, the absorbency of the ulitmate bodies of fibres is not essentially reduced.

It has also been found that using the preferred materials, namely knops of wool fibre, if the wool has been semi-scoured, it leaves residues of organic materials still on the fibres such as lanolin and wool grease, which provide adequate floatation characteristics to the bodies of wool fibres.

The invention also envisages recovering the oil or other liquid from the adsorbent material for use as may be desired.

This also enables the adsorbent material to be reused again. This reuse is also a feature of the invention.

The invention also envisages providing individually shaped articles or bodies of fibre which are adsorbent for organic substances in a form enabling the shaped material to be transported to a position where it can perform its function. It is envisaged that these "articles" could be formed of a size small enough to be manually handled, e.g., for simple household functions to sizes for use for example in engineering workshops around heavy machines such as lathes where machine oil spillage is very common through larger sizes for trans-shipment on land to situations where spillages might occur of large bulk storage organic material.

In laboratory trials, the following approximate adsorbencies have been found for various different types of oil and products of this invention in comparison to the commercial product "OILSORB".

In order to assess the adsorbancy of the wool knops for oil, three quite different grades of oil were acquired. These were chosen to represent a wide range of oil viscosities and densities. Firstly crude oil, one of the major oil spill contaminants, varies greatly in consistency depending on where it is source.

Secondly, crude from Newfoundland is waxy and almost solid, whereas crude from South Africa has a similar consistency to diesel.

The biggest proportion of crude is believed to be relatively viscous and resembles heavy fuel oil in viscosity and density. In commercial shipping practice larger quantities of crude oil are shipped than refined oil. The following oils were chosen for testing:

| 1. Heavy Fuel Oil | Density 0.9535 gm/ml |
| | Viscosity = 150 C.S.T. at 50° |
| 2. Light Fuel Oil | Density 0.9107 gm/mk |
| | Viscosity = 34 C.S.T. at 50° |
| 3. Gas Oil | Density 0.8233 gm/ml |
| | Viscosity = 3 C.S.T. at 40° |

C.S.T. = Centistokes

| | Weight of Oil adsorbed in comparison to the weight of Product (Product Weight = 1 unit) | | |
|---|---|---|---|
| Product | Gas Oil | Light Fuel Oil | Heavy Fuel Oil |
| Knops (Untreated) | 13 | 26 | 35 |
| Knops (Oil added) | 10 | 19 | 27 |
| 3M "OILSORB" | 11 | 11 | 9 |

Total adsorbency is one measure of the benefit of an adsorbent material. Another measure is the speed of adsorbency. Again, small scale laboratory trails have indicated that knops which have not been treated for buoyancy, can be fully saturated in 2 to 3 minutes whereas the commercial product "OILSORE" takes more than 10 minutes.

A number of 5 liter beakers were half filled with tap water and to each 500 mls of each of the three test oils were poured on top. To each beaker 10 gms of each of the various adsorbency materials was added. The mixture was lightly agitated with a glass stirring rod for 30 seconds.

The adsorbency material was then collected and weighed.

In order to assess the various degrees of adsorbancy of different materials relative to each other, a large water tank 1.0 m × 1.3 m was filled with tap water to a depth of 0.25 m.

Samples of 3M "OILSORB" in both sheet and boom form together with wool knops loose and also in boom form were floated on the surface. To this tank 500 mls of Heavy Fuel Oil was added and dispersed evenly over the surface. The samples were left without stirring for 24 hours.

To gain information on how long it takes for each adsorbency product to fully saturate, approximately 30 gm sample of knops and sorbent were floated on a Heavy Fuel Oil surface. The time taken for the oil to penetrate through the product was recorded.

Small booms approximately 5 cm in diameter were made of wool knops and 3M sorbent sheeting. The booms were encased with woven polypropylene shade cloth. Each was saturated in Heavy Fuel Oil, weighted, then rung through rubber squeeze rolls and then reweighted.

The rubber squeeze rolls were 49 cm long and had a pneumatic pressure of 3.8 tons applied to them.

Table 1 shows the multiples of each products own weight that was adsorbed when immersed in various grade of oil.

TABLE 1

| | Heavy Fuel Oil | Light Fuel Oil | Gas Oil |
|---|---|---|---|
| 3M Sorbent Particulate Form | × 24.0 | × 21.5 | × 14.6 |

TABLE 1-continued

|  | Heavy Fuel Oil | Light Fuel Oil | Gas Oil |
| --- | --- | --- | --- |
| 3M Sorbent Sheet Form | × 9.0 | × 11.4 | × 10.8 |
| Wool Knops | × 35.0 | × 25.6 | × 13.3 |

From these results it can be seen that the Wool Knops consistently adsorbed more oil with the exception of gas oil than the 3M products.

There is a trend that as the viscosity increases the wool knops are capable of adsorbing more oil.

This is thought to be proportional to the densities of the two sorbent products. 3M Sorbent in sheet form has a bulk of 12.5 cc/gm whereas the wool knops have a bulk of 30 cc/gm.

The actual densities of the fibres are, wool 1.1–1.3 gms/ml, and polypropylene 0.9–0.95 gm/ml. The polypropylene is a highly fibrilated structure which gives it a greatly increased surface area. It is the surface area that normally determines the degree of adsorbency. Thus the spherical shape of the fibres in the knops and the knop itself greatly affect the mechanism by which the oil is adsorbed.

The knop has a very porous structure allowing the viscous oils to easily penetrate the knop. Once the oil is within the knop structure it tends to be held in by the spherical fibre orientation. If however the oil viscosity is very low, there is a tendency for it to drain out of the knop structure more easily. This does not occur with materials such as air blown polypropylene which works on the principle of having a very large surface area to adsorb the oil. Effectively the oil is spread over the polypropylene fibre surface as a thin film.

To verify this, an additional trial was conducted to ascertain the oil retention capabilities of the various products. Samples were saturated in Heavy Fuel Oil and left to drain over a metal mesh.

Saturation factors were recorded and again after 2 hours and 20 hours. These are shown in Table II.

TABLE II

|  | Initial | 2 Hours | 20 Hours |
| --- | --- | --- | --- |
| 3M Sorbent Sheet | × 14.3 | × 13.0 | × 12.7 |
| 3M Sorbent Chopped | × 21.5 | × 13.1 | × 11.4 |
| Wool Knops | × 35.0 | × 15.9 | × 11.2 |

Samples of 3M Sorbent and wool knops both loose and in boom form, were tested for 'adsorbency'.

It was found that samples of both wool knops and the 3M products do not greatly attract oil and absorb it. At the end of the 24 hours soaking trial, only area of each adsorbency material that were directly in contact with the oil had adsorbed and this amount was minimal.

To increase the potential to adsorb oil it is necessary to have movement of either the sorbent or the oil/water mixture. Using a small wave making generator floated in the tank, it was found this helped increase the adsorbency rate but it was still now spectacular for any of the products. To get satisfactory adsorbency there need to be mechanical agitation either by rotating the booms or allowing them to be agitated as would occur at a shoreline or with natural wave movement at sea.

In cleaning out the tank between successive trails a handful of loose knops were stirred into the water in the tank and by doing this it was possible to remove all the floating oil, including the oil sheen, in 20–30 seconds.

The times recorded to visually assess how long it took for samples of loose wool knops and sheet 3M Sorbent were recorded when the samples were floated on a Heavy Fuel Oil surface. Knops saturated without agitation completely in 2 minutes.

The 3M Sorbent sheet material was not one hundred percent saturated after 10 minutes.

A drain trail was devised to determine wools (in wool knop and carded wool form) ability to retain adsorbed oil. Each adsorbent was immersed in Gas Oil, agitated gently for 45 seconds, removed and the initially saturated weight recorded.

The sorbent was then allowed to drain for 1 hour with the retained oil being recorded at one minute intervals for 10 minutes then at 5 minutes intervals for 50 minutes.

From these results pick-up factors were calculated.

| Drain Trails - Gas Oil Density 0.82 gms/ml Viscosity 3 C.S.T. at 40° C. | | | | |
| --- | --- | --- | --- | --- |
| | SORBENT WOOLSPILL | | SORBENT CARDED WOOL | |
| Total Initial Saturated Weight (gram) | 46.6 | | 33.8 | |
| Time (min) | Woolspill Retained Wt or Oil (gram) | Pick-up Factor of 1 gm | Carded Wool wt of Oil | Pick-up Factor of 1 gm |
| 1 | 38.4 | 12.8 | 22.5 | 7.5 |
| 2 | 37.7 | 12.5 | 21.9 | 7.3 |
| 3 | 37.4 | 12.4 | 21.6 | 7.2 |
| 4 | 37.3 | 12.4 | 21.5 | 7.1 |
| 5 | 37.1 | 12.3 | 21.5 | 7.1 |
| 6 | 37.0 | 12.3 | 21.4 | 7.1 |
| 7 | 36.9 | 12.3 | 21.3 | 7.1 |
| 8 | 36.9 | 12.3 | 21.2 | 7.0 |
| 9 | 36.8 | 12.2 | 21.1 | 7.0 |
| 10 | 36.7 | 12.2 | 21.1 | 7.0 |
| 15 | 36.4 | 12.1 | 20.9 | 6.9 |
| 20 | 36.1 | 12.0 | 20.9 | 6.9 |
| 25 | 36.0 | 12.0 | 20.9 | 6.9 |
| 30 | 35.8 | 11.9 | 20.8 | 6.9 |
| 35 | 35.7 | 11.9 | 20.7 | 6.9 |
| 40 | 35.6 | 11.8 | 20.6 | 6.8 |
| 45 | 35.5 | 11.8 | 20.6 | 6.8 |
| 50 | 35.4 | 11.8 | 20.6 | 6.8 |
| 55 | 35.3 | 11.7 | 20.6 | 6.8 |
| 60 | 35.2 | 11.7 | 20.6 | 6.8 |
| Gram of adsorbed oil after 60 minutes | 35.2 | | 20.6 | |

Further comparison trials have been conducted by S. L. Ross Environmental research Limited of Canada and are reported in a report entitled "Selection Criteria and Laboratory Evaluation of Oilspill Sorbents" published by Environment Canada, March 1990. This report and its trial data are incorporated herein by way of reference. This data confirms the advantageous properties of the wool knops supplied to Ross Environmental Research by the applicants for testing as an oil sorbent.

While this invention has been described with reference to preferred embodiments, it is not to be construed as being limited thereto.

We claim:

1. A method for adsorbing liquid hydrophobic substances which comprises the step of contacting the liquid with a plurality of discrete, generally spherical knops of entangled fibrous adsorbent material which have been manufactured by machinery for the production of long tailed neps.

2. A method as claimed in claim 1 wherein the material is in a loose, uncontained form.

3. A method as claimed in claim 1 wherein the knops have a range of densities in order to allow optimised oil adsorbency for a range of oil viscosities.

4. A method as claimed in claim 1 including the step of modifying the fibrous material with chemicals to modify the surface characteristics of the fibers and enhance oil pick-up or buoyancy of the knops in water.

5. A method as claimed in claim 4 wherein the chemicals are water repellents.

6. A method as claimed in claim 1 wherein the fibrous material is used in conjunction with a material shaped into an elongated system which material allows oil and oil water mixtures to penetrate thereby allowing the knops to absorb the oil.

7. A method as claimed in claim 6 wherein the material is a porous housing or netting.

8. A method as claimed in claim 1 wherein the fibrous material is used in conjunction with other fibers or buoyancy aids to increase the oil adsorbancy or buoyancy of the knops in water.

9. A method as claimed in claim 1 wherein the fibrous material is used in conjunction with bacterial nutrients to allow bacteria to break down the oil.

10. A method as claimed in claim 1 wherein the fibrous material is used as a filter, to filter oil from an oil and water mixture.

11. A method a claimed in claim 1 wherein the fibrous material is used in conjunction with reused, dyed or undyed fibrous materials in knop form.

12. A method as claimed in claim 1 wherein the fibrous material is wool.

13. A method of separating liquid hydrophobic substances floating on water from the water which comprises the steps of:
  (a) providing a plurality of discrete, generally spherical knops of entangled fibrous adsorbent material which are floatable;
  (b) placing said knops of step (a) in contact with said liquid hydrophobic substances such that said liquid hydrophobic substances become adsorbed on said knops, and
  (c) removing said knops with liquid hydrophobic substances adsorbed thereon from contact with said water.

14. A method according to claim 13, including between steps (a) and (b) the step of placing said knops within a plurality of porous containment means.

* * * * *